United States Patent [19]

Hamanaka et al.

[11] Patent Number: 5,301,322
[45] Date of Patent: Apr. 5, 1994

[54] SYSTEM FOR CONVERTING JOB/PROCESS IDENTIFIERS INTO PROCESSOR/PROCESS IDENTIFIERS IN TRANSFERRING DATA BETWEEN PROCESSES IN A MULTIPROCESSOR SYSTEM

[75] Inventors: Naoki Hamanaka, Tokyo; Teruo Tanaka, Hachioji; Koichiro Omoda, Sagamihara; Shigeo Nagashima, Hachioji, all of Japan

[73] Assignee: Hitachi, Ltd., Tokyo, Japan

[21] Appl. No.: 912,215

[22] Filed: Jul. 10, 1992

Related U.S. Application Data

[63] Continuation of Ser. No. 379,230, Jul. 13, 1989, abandoned, which is a continuation of Ser. No. 52,871, May 22, 1987, abandoned.

[30] Foreign Application Priority Data

May 23, 1986 [JP] Japan ............... 61-117351

[51] Int. Cl.⁵ .................................................. G06F 9/00
[52] U.S. Cl. ...................... 395/650; 395/800; 364/DIG. 1; 364/284.3; 364/260.1; 364/261.2; 364/230.3
[58] Field of Search ............ 364/200, 300, 900; 395/200, 650, 800

[56] References Cited

U.S. PATENT DOCUMENTS

| | | | |
|---|---|---|---|
| 4,413,318 | 11/1983 | Herrington | 395/650 |
| 4,423,414 | 12/1983 | Bryant et al. | 340/825.07 |
| 4,447,874 | 5/1984 | Bradley et al. | 395/650 |
| 4,500,960 | 2/1985 | Babecki et al. | 395/325 |
| 4,530,051 | 7/1985 | Johnson et al. | 395/200 |
| 4,644,468 | 2/1987 | Doster et al. | 395/200 |
| 4,649,473 | 3/1987 | Hammer et al. | 395/200 |
| 4,654,654 | 3/1987 | Butler et al. | 340/825.5 |
| 4,694,396 | 9/1987 | Weisshaar et al. | 395/200 |
| 4,754,395 | 6/1988 | Weisshaar et al. | 395/650 |
| 4,807,116 | 2/1989 | Katzman et al. | 395/200 |
| 4,825,354 | 4/1989 | Agrawal et al. | 395/600 |
| 4,835,685 | 5/1989 | Kun | 395/650 |
| 4,914,583 | 4/1990 | Weisshaar et al. | 395/650 |
| 4,920,483 | 4/1990 | Pogue et al. | 395/425 |

FOREIGN PATENT DOCUMENTS 0052712 6/1982 European Pat. Off. .
84/03192 8/1984 World Int. Prop. O. .

OTHER PUBLICATIONS

Sam, J. G. "Node Processor for Distributed System Control," IBM TDB, vol. 23, No. 5, pp. 1811-1812 (Oct. 1980).
Hoshino, T. et al, "PACS: A Parallel Microprocessor Array for Scientific Calculations", ACM Transactions on Computer Systems, vol. 1, No. 3, pp. 195-221 (Aug. 1983).
Lin, M. T., et al "Message Communication Protocol and Operating System Design for the Distributed Loop Computer Network (DLCN)", The 4th Annual Symposium on Computer Architecture, Mar. 22-25, 1977, pp. 193-200, IEEE.
Chugh, R., "A Network-Wide Interprocess Communication Facility for the Xenix Operating System," Fifth Annual International Phoenix Conference on Computers and Communications, Scottsdale, Ariz., Mar. 26-28, 1986, pp. 215-221, IEEE.

Primary Examiner—Thomas C. Lee
Attorney, Agent, or Firm—Antonelli, Terry, Stout & Kraus

[57] ABSTRACT

A parallel processor system includes a transfer circuit and a plurality of processors each of which executes at least one of a plurality of mutually associated programs. The transfer circuit transfers data from a sending program allotted to one processor to a receiving program allotted to another processor by identifying the other processor and the receiving program based on a job number and within-job process number outputted by the sending program.

26 Claims, 8 Drawing Sheets

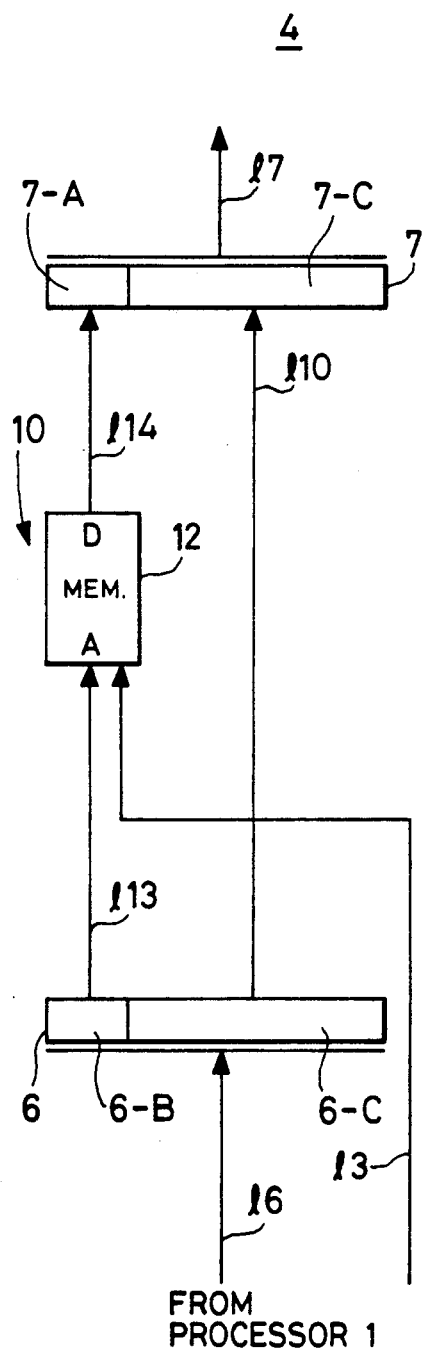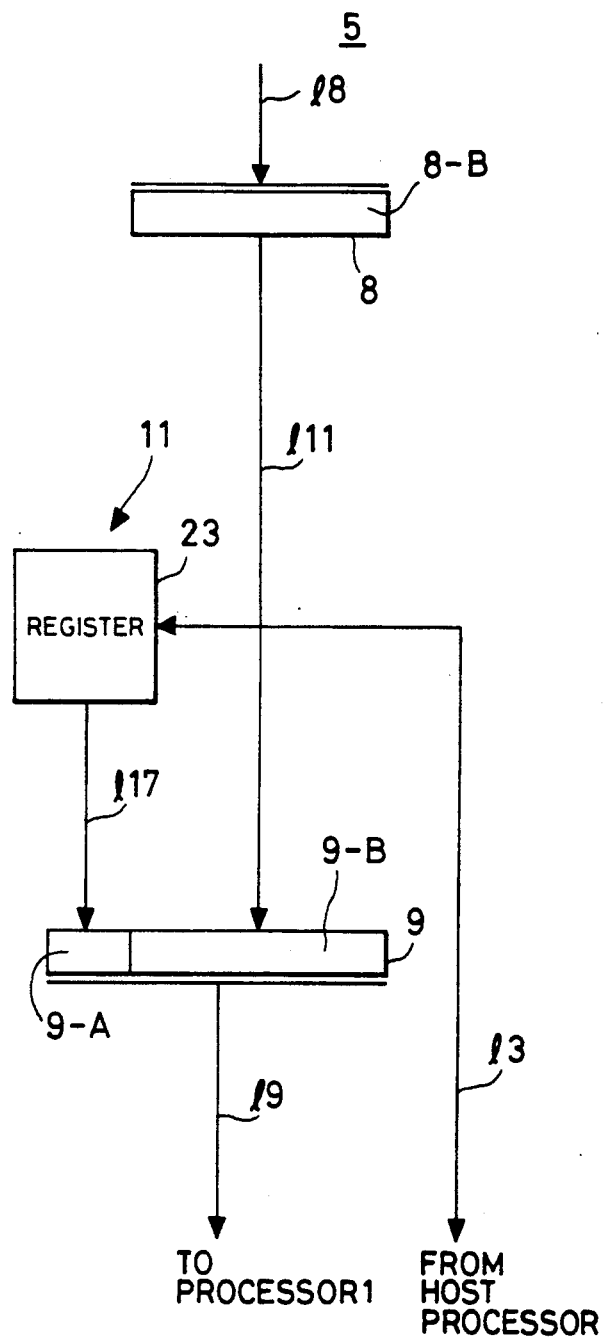
FIG. 9A
FIG. 9B

SYSTEM FOR CONVERTING JOB/PROCESS IDENTIFIERS INTO PROCESSOR/PROCESS IDENTIFIERS IN TRANSFERRING DATA BETWEEN PROCESSES IN A MULTIPROCESSOR SYSTEM

This application is a continuation application of Ser. No. 379,230, filed Jul. 13, 1989, now abandoned, which is a continuation of application Ser. No. 052,871, filed May 22, 1987, which is now abandoned.

BACKGROUND OF THE INVENTION

This invention relates to a parallel processor consisting of a plurality of processors that can operate in parallel with one another.

As one of the methods of improving processing speed, there is known a method which constitutes a parallel processor system equipped with a plurality of processors operable in parallel with one another various reports have been made in the past on such a technique. (For instance, refer to ACM Transactions on Computer Systems, Vol. 1, No. 3, August, 1983, pages 195–221.)

For programming in the conventional parallel processor system, a program consisting of the aggregate of units of work is generated and each of the units of work are executed in parallel so that one processing can be executed as a whole. This unit of work consists of a program and control information necessary for the execution of the program, but the present invention will hereinafter deal primarily with the program alone. Accordingly, the unit of work will be hereinafter called a "process" and a group of such processes, a "job". In the parallel processor system, one or a plurality of groups (jobs) are executed in parallel with one another.

When programming is made in conventional systems of this kind, it has been necessary to divide processing to be executed into a plurality of processes and to rely upon a hardware construction of the system to make program description for communication between the processes. In other words, it has been necessary to determine in advance which process is to be allotted to which processor.

Furthermore, in order to establish communication from a certain process to another such as transfer of data from the former to the latter, programming must be made so that the receiving process designates the identification number of the processor that is allotted at present. This requires excessive labor on the port of a programmer when preparing the program. In addition, when the number of processors changes such as when the number is increased or decreased due to trouble or the like, the programs that have been prepared previously cannot be used.

The conventional technique described above is not free from the drawback that the program of the parallel processor system depends greatly on the hardware and casts a burden on a programmer. Another problem is that portability of the program is low with respect to the change of the hardware construction of the parallel processor system. This means that system versatility is low.

SUMMARY OF THE INVENTION

The present invention is therefore directed to provide a parallel processor system capable of executing a program which is prepared without determining in advance which process is to be alloted to which processor.

The object described above can be accomplished by a parallel processor system which comprises a plurality of processors capable of operating independently of one another and transfer means for transferring data outputted from any one of the programs during execution of one program by any one of the processors to the other of the processors to which a receiving program is allotted, in response to a program identification code outputted during execution of one program described above by one processor described above in order to identify the receiving program.

BRIEF DESCRIPTION OF THE DRAWINGS

FIG. 9A shows the construction of a send address translator in still another embodiment of the present invention;

FIG. 9B shows the construction of a receive address translator to be used in combination with the apparatus shown in FIG. 9A;

DESCRIPTION OF THE PREFERRED EMBODIMENTS

Hereinafter, the present invention will be described in further detail with reference to some preferred embodiments shown in the accompanying drawings.

EMBODIMENT 1

Figure 1:
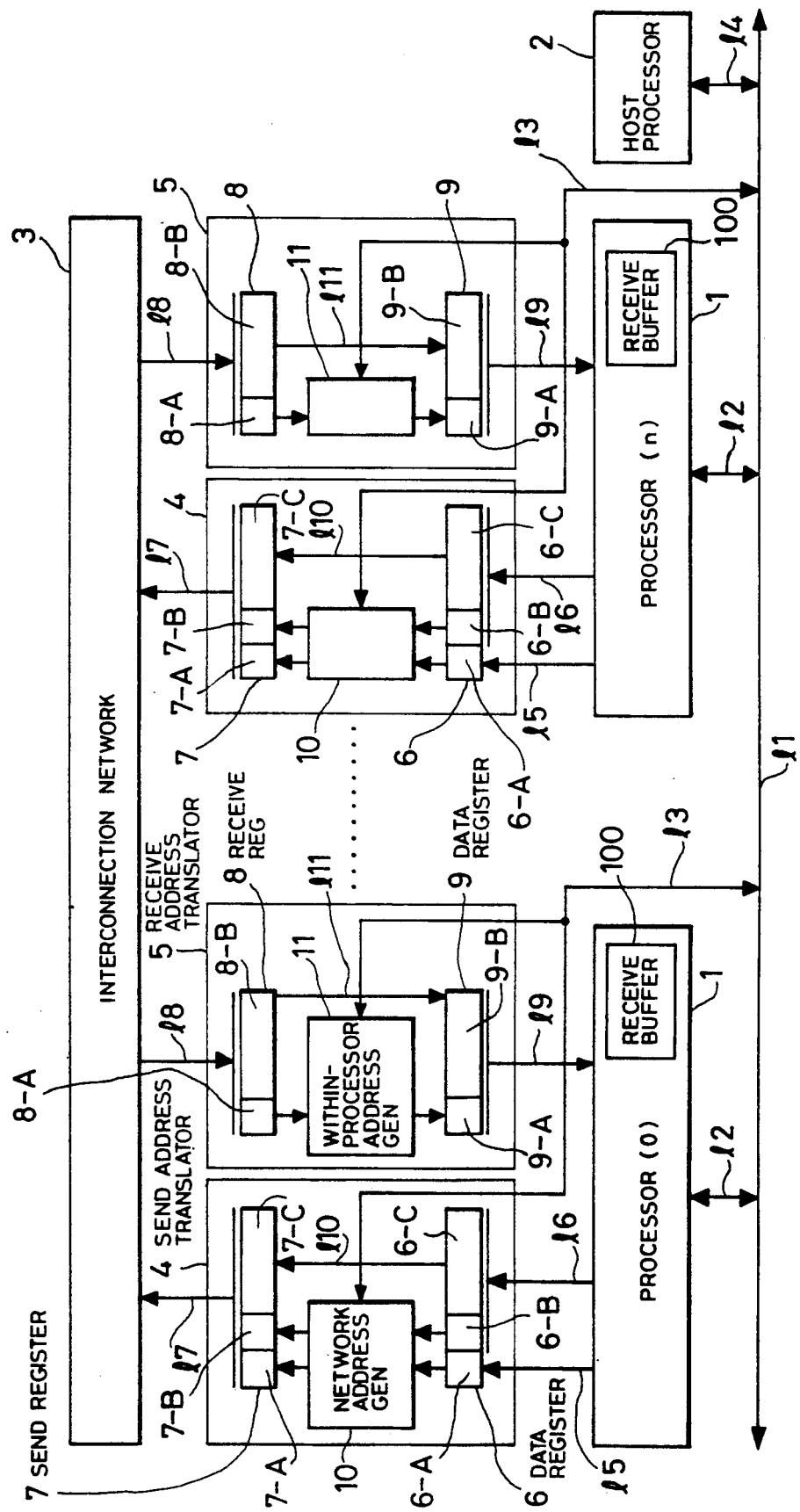
FIG. 1 shows an embodiment of a parallel processor system of the present invention.

FIG. 1 shows a first embodiment of a parallel processor system in accordance with the present invention.

This system consists of n+1 processors 1 having the same construction. They will be hereinafter called "processor (0)~processor (n)". The drawing shows only the processors (0) and (n) for simplification.

First of all, the program to be executed by this parallel processor system will be explained. One job includes a plurality of processes that can be executed in parallel with one another. A number called "job number" is assigned to each job. The job number is managed in such a manner that each job number is unique in this parallel processor system at each time and different jobs cannot have the same job number. A number starting from zero (0) is put to the processes constituting the job and called a "within-job process number".

A given process can send data to other processes belonging to the same job. At this time, the within-job process number is designated as the address of the data to be sent.

When a given job is executed, a plurality of processes constituting that job are distributed by a host processor to various processors. To distinguish the processes distributed to the same processor at this time, a number starting from zero (0) and called "within-processor process number" is determined.

In summary, two kinds of codes exist in order to primarily distinguish the processes in this parallel processor system. One is a code which uses the set of the job number and the within-job process number and the other is a code which uses the set of the processor number to which the process is allotted and the within-processor process number.

When each process sends data to other processes in this embodiment, the set of the numbers of the former is used to designate the receiving process, and in this data transfer, the set of the numbers of the former is translated to the set of the numbers of the latter and the set of the numbers after translation is used in order to effect data transfer to the processor to which the receiving process is allotted.

In FIG. 1, reference numeral 2 represents a host processor, 3 is an interconnection network for the data transfer between the processors 0 to n, 4 is a send address translator and 5 is a receive address translator.

Though the same send address translator and the same receive address translator are provided to the processor (s) not shown in the drawing, they are omitted from the drawing.

In the send address translator 4, reference numeral 6 represents a data register, 7 is a send register and 10 is a network address generator. In the receive address translator 5, reference numeral 8 represents a receive register, 9 is a data register and 11 is a within-processor-address generator.

The host processor 2 is of a program control type processor and programmed in such a manner as to send data to each part of the parallel processor system through channels 14, 11, 12, 13 and to control each processor.

Which process constituting a given job is to be allotted to which processor is determined in advance and a necessary process is loaded to a program memory (not shown) inside each processor in accordance with this determination.

Each processor 1 is of a program control type processor which can operate independently of one another, and is formed, for example, by connecting a memory and others to a Microprocessor MC68000 of Motorola Inc.

Each processor 1 has a receive buffer 100, which consists of a plurality of fields allotted to the processes executed in that processor, respectively.

Figure 2:
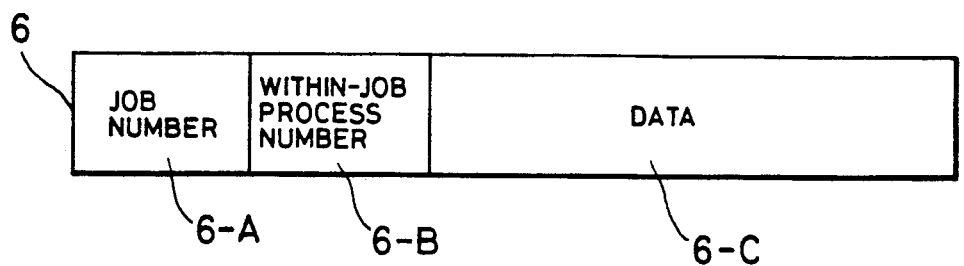
FIG. 2 shows signals inside a data register 6 in the system shown in FIG. 1.

Each processor 1 is programmed so that when the execution of a given process is started, the processor 1 gives in advance the job number of the job to which the process belongs to the field 6-A of the data register 6 in the corresponding send address translator 4 through the channel 15. When the process that is being executed sends data to the process allotted to another processor, the processor 1 is programmed so that it outputs the within-job process number of the receiving process and the data to be transferred to the fields 6-B and 6-C of the data register 6 through the channel (6, respectively. As a result, the content of the data register 6 becomes such as shown in FIG. 2.

Figure 3:
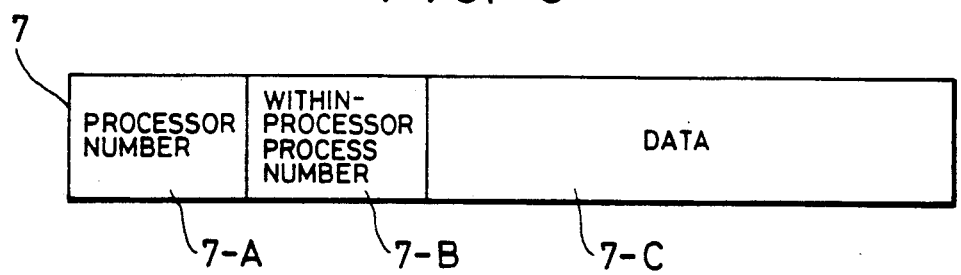
FIG. 3 shows signals inside a send register 7 in the system shown in FIG. 1.

The network address generator 10 in each send address translator 4 outputs the processor number of the processor, in which the process designated by the job number and the within-job processor number given to the fields 6-A and 6-B of the data register 6, respectively, is located, as well as the process number inside that processor for the designated process, in response to the job number and the within-job processor number described above, and sends them to the fields 7-A and 7-B of the send register 7, respectively. Incidentally, the data given to the field 6-C of the data register 6 is as such given to the field 7-C of the send register 7. As a result, the content of the send register becomes such as shown in FIG. 3.

Figure 6:
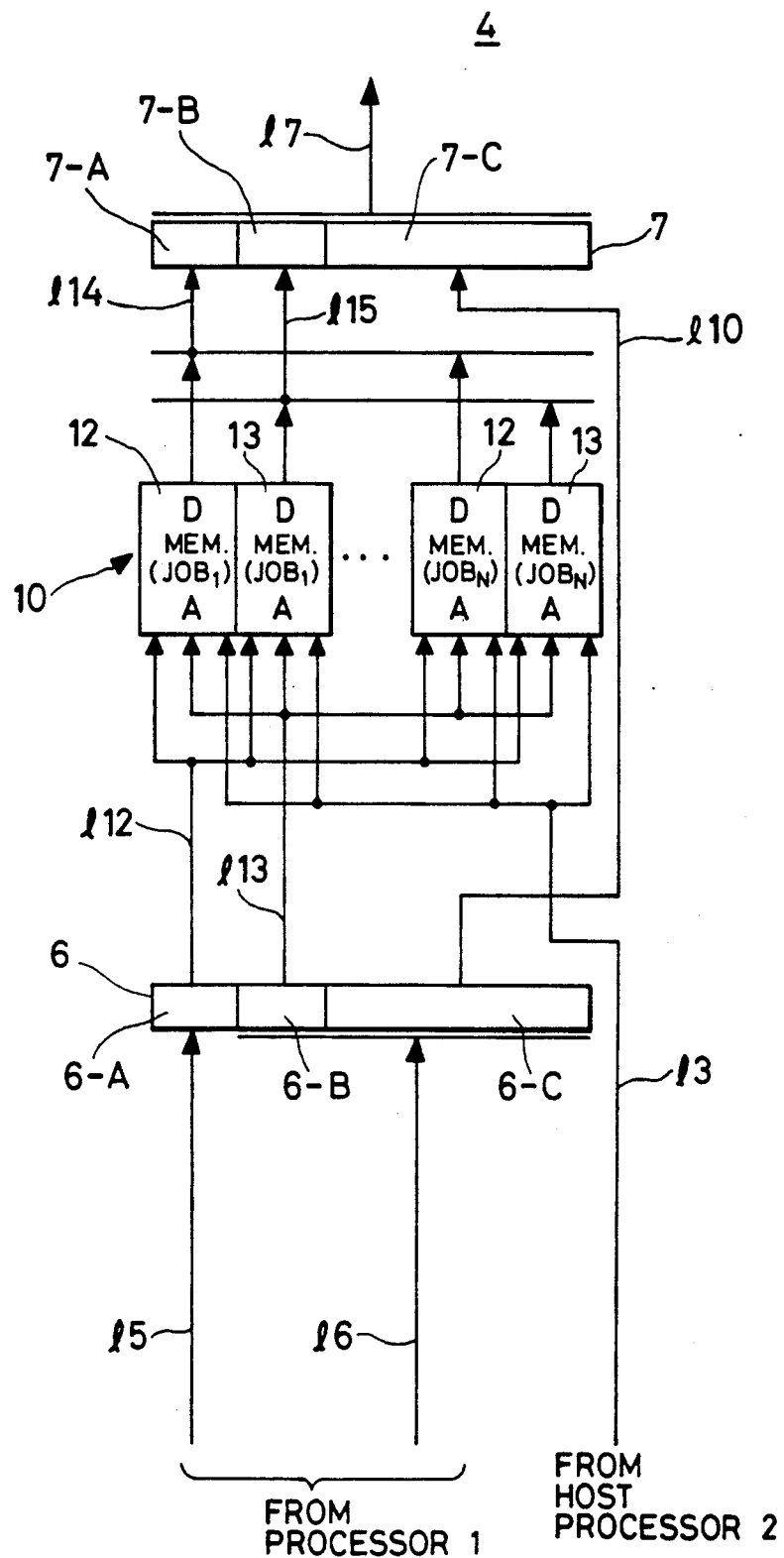
FIG. 6 shows the construction of a send address translator 4 in the system shown in FIG. 1.

FIG. 6 shows in detail the send address translator 4. The network address generator 10 consists of a memory to which access is made using the job number and the within-job processor number in the fields 6-A and 6-B in the data register 6 as the address and which stores the processor number and within-processor process number of the corresponding processor at its address positions. This data are written in advance by the host processor 1 into this More definitely, assuming that the total number of jobs is N, then this memory consists of N-order processor number generation memories 12 and N within-processor process number generation memories 13.

The host processor 2 sets the processor number to which the process having the within-job process number k and belonging to the job number j is allotted to the kth address of the jth processor address generation memory 12 (where $j=1, 2, \ldots,$ or N), and the number of the process (within-processor process number) in the processor to which the process having the process number k and belonging to the job number j is allotted to the kth address of the jth within-processor process number generation memory 13 (where $j=1, 2, \ldots,$ or N).

The interconnection network 3 is disposed in order to transfer the content of the send register 7 of the sending processor, such as the processor (0), to the receive register, 8 of the receiving processor, such as the processor (n).

Figure 4:
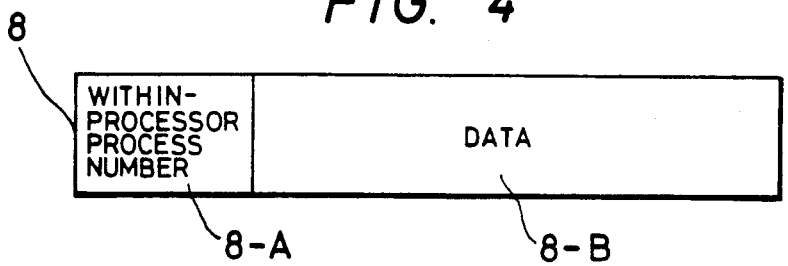
FIG. 4 shows signals inside a receive register 8 in the system shown in FIG. 1.

Assume, for example, that the processor number for the processor (n) is set to the field 7-A in the send register 7 for the processor (0). The contents of the fields 7-B and 7-C of the send register 7 for the processor (0), that is, the within-processor process number and the data, are transferred to the fields 8-A and 8-B of the receive register 8 in the receive address translator 5 which is connected to the processor (n), respectively. As a result, the content of the receive register 8 becomes such as shown in FIG. 4.

Figure 5:
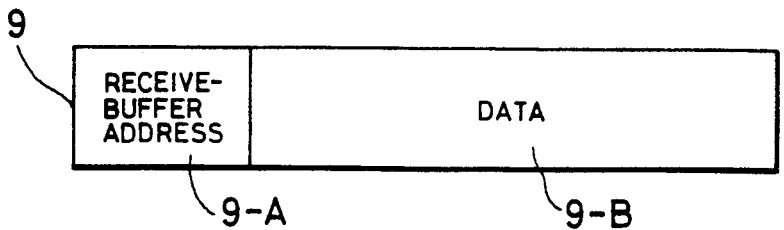
FIG. 5 shows signals in a data register 9 in the system shown in FIG. 1.

The within-processor-address generator 11 in each receive address translator 5 outputs the address of the receive buffer region to the field 9-A of the data register 9 in response to the within-processor process number given to the field 8-A of the receive register 8. As a result, the content of the data register 9 becomes such as shown in FIG. 5. Incidentally, the data given to the field 8-B of the receive register 8 is transferred as such to the field 9-B of the data register 9 and written into the position represented by the address in the field 9-A in the receive buffer 100 inside that processor.

The within-processor-address generator 11 consists of a memory to which access is made by use of the within-processor process number as the address, for example, and which stores the receive buffer address. This receive buffer address is written in advance by the host processor through the channels 14, 11 and 13. More definitely, the host processor 2 sets the receive buffer address of the process which is allotted to the processor connected to the receive address translator and has the within-processor process number k, to the kth address of this memory.

Hereinafter, the operation will be described in detail.

Upon receiving the job start command from a user, the control program on the host processor 2 makes the following operations.

(1) The job number is determined for each job so that it does not overlap between all the jobs to be executed simultaneously by the parallel processor system.

(2) Process allotment is made so that which process constituting each job is to be executed as which process of which processor. In other words, the set of the processor number of the processor, that can be used at that point of time, and the process number in that processor is allotted one by one for each set of the job number and the within-job process number that is determined for each process.

In this embodiment, allotment is made under the following condition.

Allotment condition (1)

When the set of the job number and the within-job process number is different, the corresponding set of the processor number and within-processor process number is different.

The receive buffer region to be used by a given process in the buffer memory 100 in the processor, to which each process constituting each job is allotted, is determined by communication with the processor through the channels 14, 11 and 12, whenever necessary.

On the basis of the allotment described above, the processor number, the within-processor process number or the address of the receive buffer region is set to the send address translator 4 and receive address translator 5 connected to each processor to which each process constituting this job is allotted through the channels 14, 11 and 13.

The program determining the operation of each process is transmitted to each process through the channels 14, 11, 12 in accordance with process allotment described above.

A signal permitting the start of this job is sent to each processor through the channels 14, 11 and 12.

The job on the parallel processor system is started by the operation of the control program on the host processor described above.

Next, the operation of the parallel processor system after the start of the job will be described.

First of all, the processor picks up one process that can be executed among the processes allotted thereto, and executes it. The operation that does not involve data transfer to the other processes is the same as the operation of an ordinary processor system. When the process in execution needs to transfer data to other processes, or when there is instruction in the program to designate the process number and data of the receiving part and to send them, the processor sends the job number to which the process requesting the data transfer belongs, the process number of the receiving part designated by the program and the data to the fields 6-A, 6-B and 6-C of the send data register 6 in the send address translator 4, respectively. Upon receiving them, the send address translator 4 determines the processor number to which the receiving process of the data is allotted and the within-processor process number of the receiving process and gives them to the fields 7-A and 7-B of the send register 7. The content of the field 6-C is given as such to the field 7-C. Then, the interconnection network 3 sends the values of the fields 7-B and 7-C of the send register of the sending part to the fields 8-A and 8-B of the receive register 8 in the receive address translator 5 connected to the processor which is designated by the send processor number given by the field 7-A of the send register 7. Upon, receiving these values, the receive address translator 5 determines the address of the receive buffer region of the process from the within-processor process number given to the field 8-A of the receive register 8 and puts it to the field 9-A of the receive data register 9. It puts the data given to the field 8-B of the receive register 8 to the field 9-B of the receive data register 9. Then, the data of 9-B is written into the address designated by 9-A and data communication is thus complete.

EMBODIMENT 2

Figure 7:
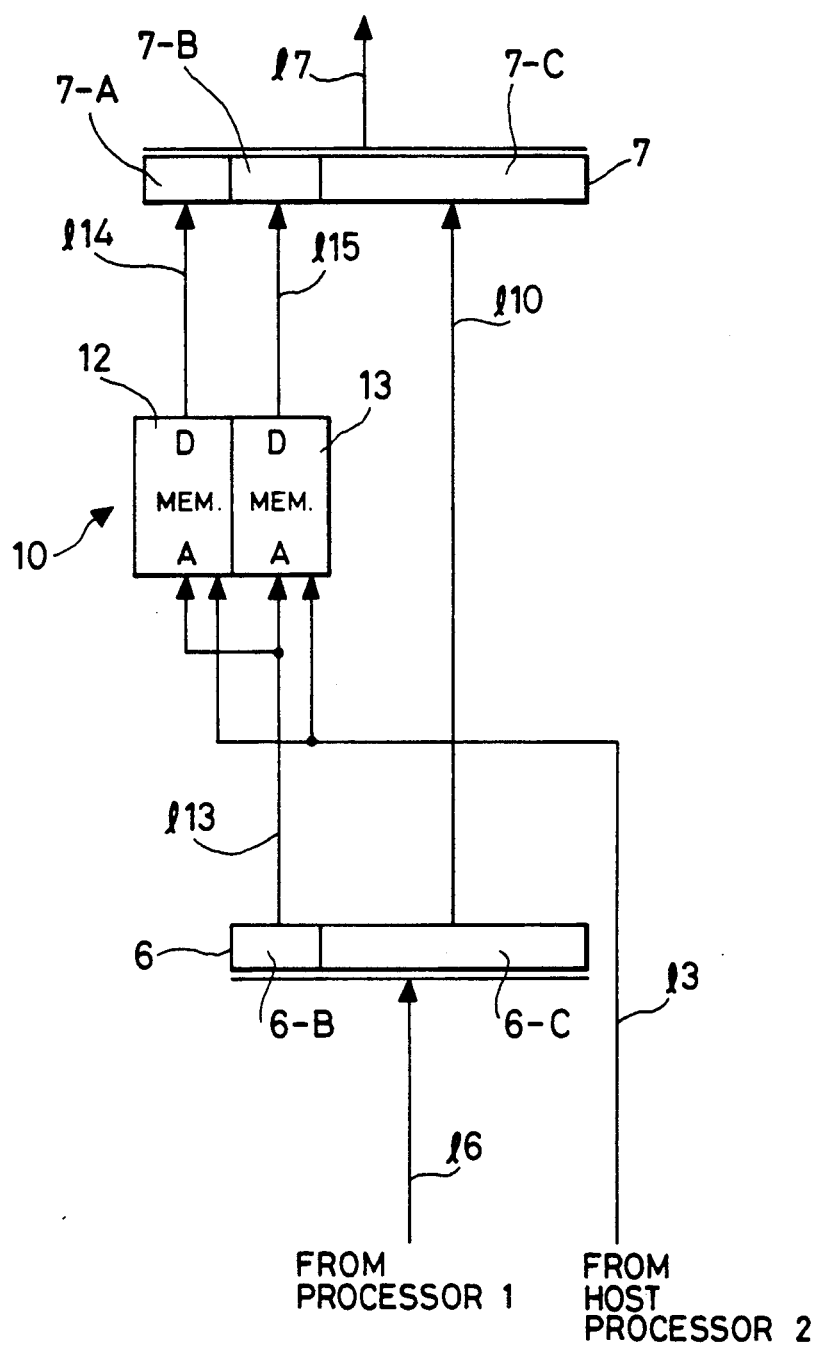
FIG. 7 shows the construction of a send address translator in another embodiment of the present invention.

If allotment of the process to the processor by the host processor 2 is made in accordance with the following condition (2), the send address translator shown in FIG. 1 can be more simplified as shown in FIG. 7.

Allotment condition (2)

The allotment condition (1) is satisfied and all the processes belonging to one processor belong to the same job.

Under the condition described above, each send address translator 4 makes only address translation relating to one job allotted in advance. Therefore, even if the job number is not designated from the processor, address translation can be made on the basis of the within-job process number. In this case, the network address generator 10 can be composed of a pair of memories consisting of a memory 12 to which access is made by use of the within-job process number as the address and which outputs the processor number and a memory 13 to which access is made by use of the within-job process number as the address and outputs the within-processor process number, as shown in FIG. 7. At this time the data/register 6 may consist of a register devoid of the field 6-A of FIGS. 1 and 6, as shown in FIG. 7. It is possible to eliminate also the channels 15 and 112 of FIGS. 1 and 6.

The receive address translator 5 is the same as one shown in FIG. 1.

EMBODIMENT 3

Figure 8:
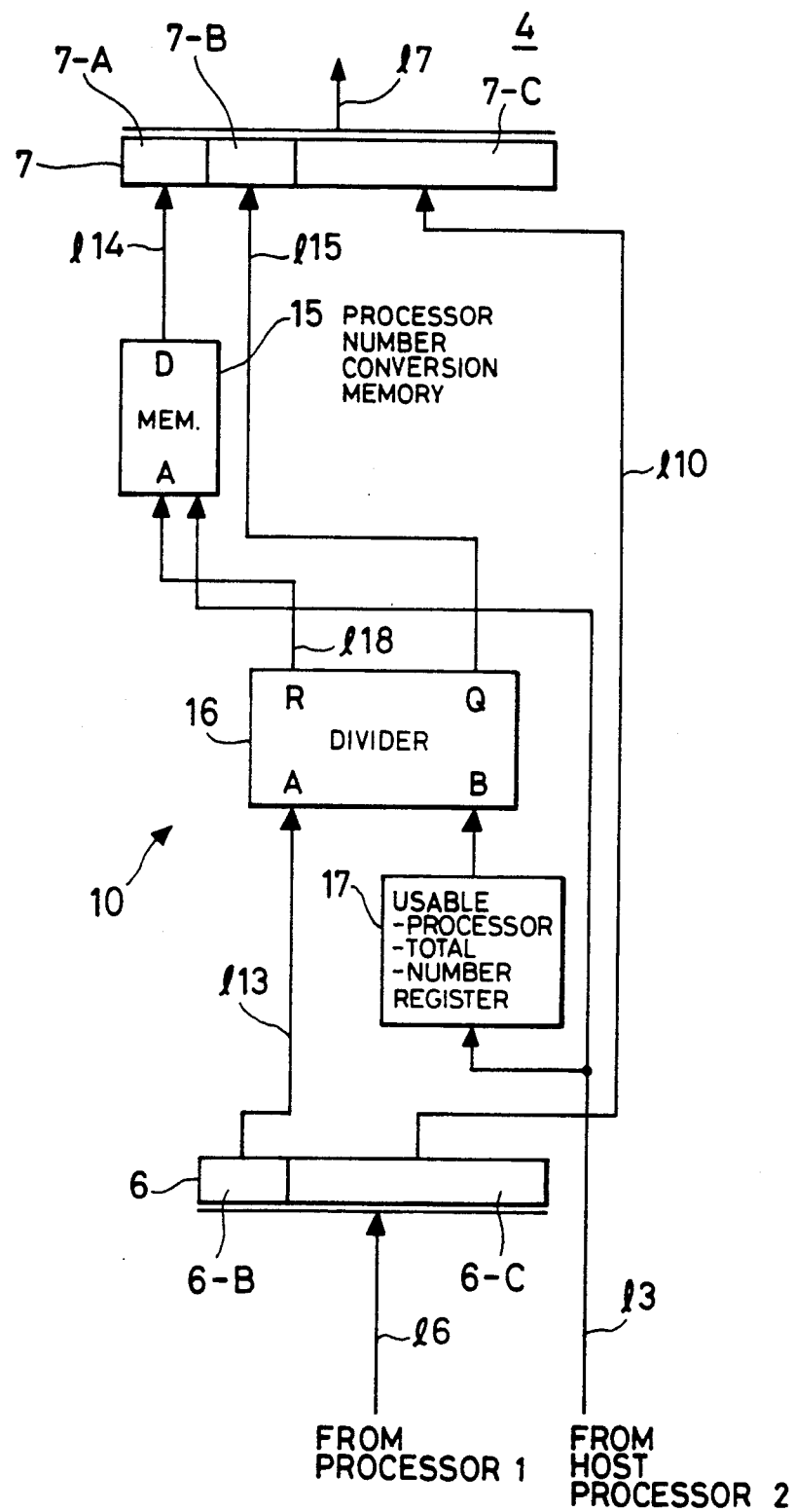
FIG. 8 shows the construction of a send address translator in still another embodiment of the present invention.

The send address translator 4 can be constituted by a divider by changing the allotment condition in the following way as shown in FIG. 8.

Allotment condition (3)

Allotment is made under the allotment condition (2). Namely, the number of processes constituting one job is m and the number of processors executing this job is n. The value n is below the number of processors belonging to the parallel processor system. Here, m processes are divided into the n groups in the following manner.

It will be assumed that when j is divided by n, the quotient is Q and the remainder is R, and the process having the within-job process number j is called "Qth process of Rth group".

Next, correspondence is established on the 1:1 basis between the n groups thus obtained and the n processors used for this job. The number put to the process in each group is used as such as the within-processor process number.

The construction of the send address translator 4 in this case is shown in FIG. 8. In the drawing, reference numeral 16 represents the divider, which divides the value given to its port A by the value given to its port B and outputs the quotient to the port Q and the remainder to the port R. Reference numeral 15 represents a processor number conversion memory. Reference numeral 17 represents a usable-processor-total-number register, and these elements 15 to 17 constitute the network address generator 10. Data are written in advance to this memory 15 by the host processor in the following manner.

The host processor 2 writes the value n described above into the usable-processor-number register 17 in the send address translator 4 and the number of the processor corresponding to the group of each process described in connection with the allotment method at the position using the group number as the address, as the initial operation of the host processor 2 through the channel 13.

Since this embodiment does not need the job number for translation, either, in the same way as in the foregoing embodiment, the register 6 may be one devoid of the field 6-A in the same way as in FIG. 7. As described above, the usable-processor-number register 17 stores the processor number (n described above) used by the job to which the processes to be executed by the processor connected to the send address translator 4 belongs.

Incidentally, the receive address translator 5 is exactly the same as the translator shown in FIG. 1.

The operation of the send address translator 4 is as follows. This apparatus reproduces the operation of the host processor 2 at the time of process allotment with fidelity. Namely, the divider 16 divides the within-job process number given to the data register 6 by the number of processors executing the job and gives the quotient Q as the within-processor process number to the field 7-B of the send register 7 through the channel 115. The remainder R represents the group number described above and is used as the address input to the processor number conversion memory 15, and the processor number as its output is given to the field 7-A of the send register 7 through the channel 114. The data given to the send data register 6 are handled in the same way as in the foregoing embodiments.

EMBODIMENT 4

The divider 16 can be constituted by a more simplified circuit by limiting the allotment condition of Embodiment 3 in the following manner.

Allotment Condition (4) in the same allotment condition as the allotment condition (3) and further limited so that p and q are integers, the within-job process number given by the processor 1 is data of p-ary representation and the number n of processors allotted to the job is $p^q$.

At this time, data expressing the value q by the p-ary representation is set in advance to the usable-processor-total-number register 17.

In this case, the divider can be constituted as a selection circuit (not shown) which outputs the q digits from below of the data of the within-job process number given through the channels 113 as the remainder and the upper digits as the quotient.

EMBODIMENT 5

Under the allotment condition described below, the send address generator 4 and the receive address generator 5 can be more simplified as shown in FIGS. 9A and 9B, respectively.

Allotment condition (5)

Up to one process is alloted to one processor.

The send address translator 4 does not need the job number. Since up to one process is disposed in one processor, the within-processor process number is not necessary, either. Therefore, a memory 12 to which access is made using the within-job process number as address and which outputs the corresponding processor number can be used as the network address generator 10 as shown in FIG. 9A.

In this case, the data register 6 may be one devoid of the field 6-A of the register of FIG. 1, as shown in FIG. 9A. The send register 7 may be one devoid of the field 7-B of the register of FIG. 1, as shown in FIG. 9A.

On the other hand, the receive address translator 5 may have only the field 8-B for the data as shown in FIG. 9B. Since it is necessary for the within-processor-address generator 11 to output only a single buffer address, it may consist of the register 23 alone as shown in FIG. 9B.

EMBODIMENT 6

The network address generator 10 shown in FIG. 1 can be constituted not only by the random-access memories shown in FIG. 6 but also of associative memories. Hereinafter, the following allotment condition (6) must be satisfied.

Allotment condition (6)

The parallel processor system executes only one job and only one process is allotted to one processor. The within-job process number is made to correspond, in principle, as such to the processor number but if there is any fall-off of the processor number to be used, a number greater than the process number constituting the job is allotted to the processor.

Figure 10:
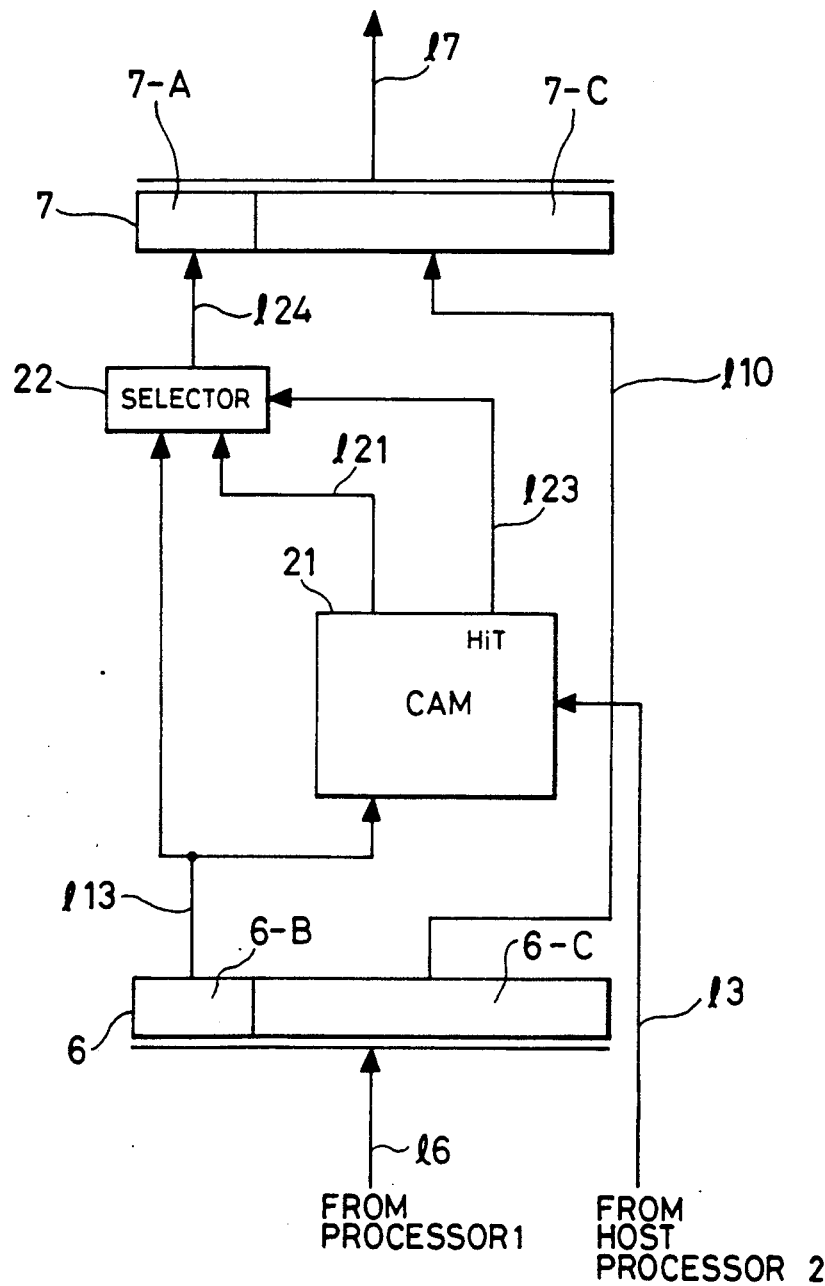
FIG. 10 shows the construction of a send address translator in still another embodiment of the present invention.

FIG. 10 shows the send address translator 4 in accordance with this embodiment.

In the drawing, reference numeral 6 represents the data register, 7 is the send register, 21 is the associative memory and 22 is a selector. The associative memory 21 outputs a value representing a truth value to the channel 123 if the value inputted from the channel 113 is registered, and outputs the value stored as a set with the value inputted from the channel 113, to the channel 121. It outputs false at other times. The selector outputs the value of the channel 21 to the channel 124 if the value outputted to the channel 123 is the truth value and the value of the channel 113 to the channel 124 if the value is false. The receive address translator 5 is the same as one shown in FIG. 9B.

If there is any processor number which must be dealt with as a fall-off number during allotment described above, the host processor sets the set of the fall-off number and the processor number to be used in place of the former to the associative memory 21 through the channel 13 so that the latter can be associated with and searched by the former.

If the process number given to the data register 6 is not registered as the fall-off number to the associative memory 21 in the operation of the parallel processor system described above, the selector 22 sends as such the process number in the data register 6 to the send register 7 and if it is registered, the selector 22 selects the substituting processor number to be outputted from the associative memory 21 and sends it to the send register 7 as the data send processor number. The data sent from the network through the channel (8 are stored in the receive data register 9 together with the content of the address register 23 and written into the receive buffer region.

EMBODIMENT 7

Figure 11:
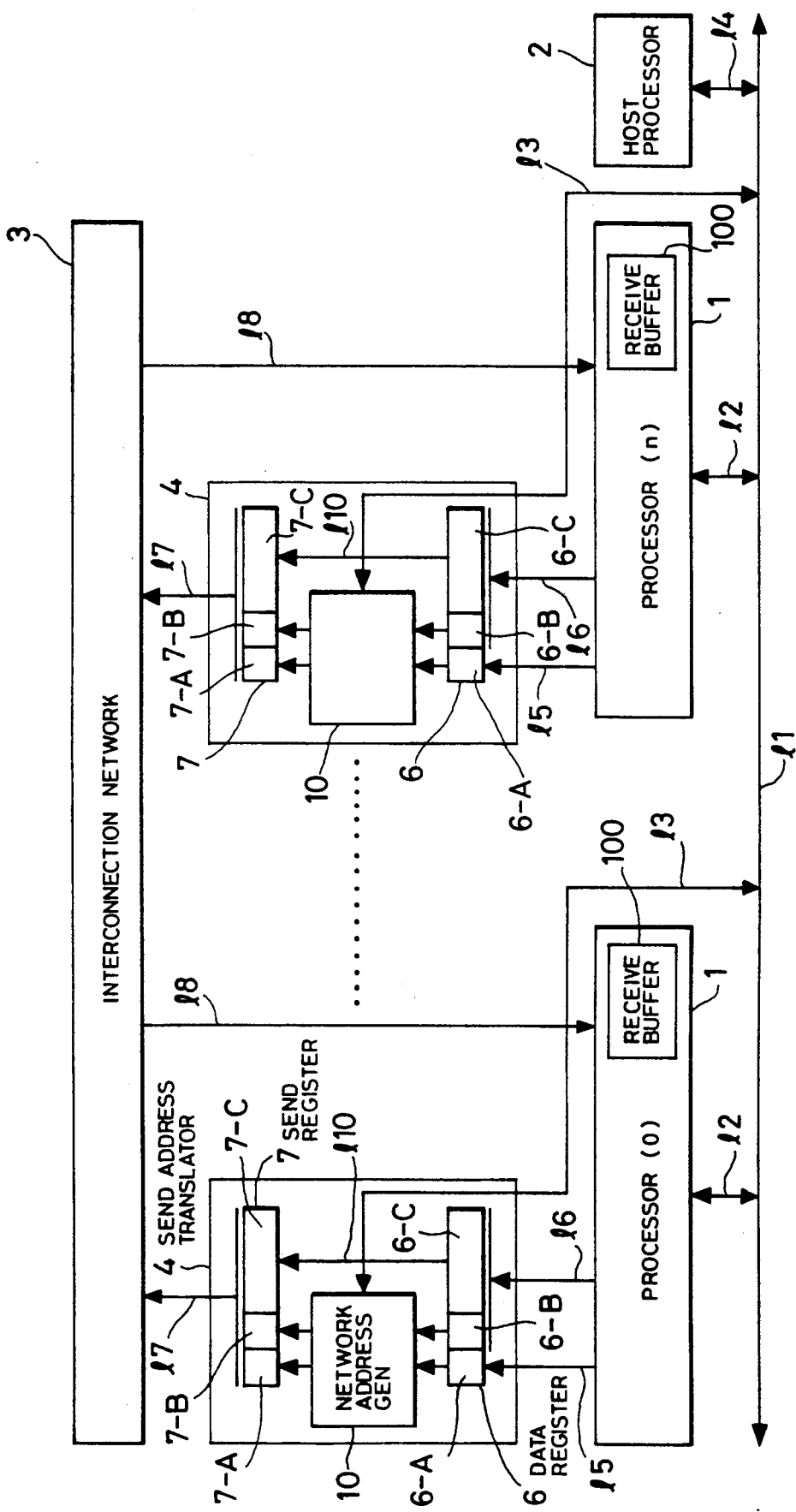
FIG. 11 shows still another embodiment of the present invention.

If the host processor 2 initially sets in advance the receive buffer address of the process, not the within-processor process number, to the within-processor process number generation memory 13 (shown in FIGS. 6 or 7) in the send address translator 4 of Embodiment 1 or 2, it becomes possible to eliminate the within-processor address generator 11 and to directly connect the channel 116 to the channel 117. Furthermore, it is possible to eliminate the receive register 8 and to directly connect the channel 18 to the data register 9. FIG. 11 shows a parallel processor system formed in such a fashion.

In each of the embodiments described above, control of processors inside the parallel processor system and distribution of processes are borne by the host processor 2 outside the system, but it is possible in each embodiment described above to provide such functions to one of the processors of the parallel processor system such as the processor (0) and to eliminate the host processor 2 and the channel 14.

In each of the embodiments described above, the send address translator 4 and the receive address translator 5 are independent apparatuses of each other and are assorted among the processors 1 and the interconnection network 3, but they may be constituted as part of each processor 1 or the interconnection network.

The present invention makes it possible to determine the distribution of a plurality of processes that can operate in parallel with one another and make mutual communication to the processors inside the parallel processor system for each job after programming, so that even when the number of processors of the parallel processing system changes, processing can be executed as such without any change. The present invention can correctly execute multiple jobs.

Even when each processor in the parallel processing system performs multi-processing, communication between the processes can be made correctly, so that a user of the system is released from the concept of the number of processors and processes.

Therefore, the user can stand on a more abstract programming environment in that a plurality of processes exist, and system versatility can be improved as well.

We claim:

1. In a multiple processor system comprising a plurality of processors for executing programs which belong to at least one of a plurality of program groups, wherein the program which belong to any one of the program groups are allotted to different ones of the processors, wherein each program group is identified by a unique program group identification code (program group ID), and wherein each program within any one of the program groups is identified by a unique within-group program identification code (within-group program ID), a method comprising the steps of:

providing by each processor a combination of the program group ID assigned to the program group of the one program currently being executed by said each processor and the within-group program ID assigned to another one of the programs which belongs to the program group of the one program and which is to receive data outputted from said each processor during execution of the one program;

identifying, in response to the program group ID/within-group program ID combination, another one of said processors to which said another program is allotted;

providing, in response to the program group ID/within-group program ID combination, a within-processor program identification code (within-processor program ID) which identifies said another program among the programs allotted to said another processor;

providing, in response to the within-processor program ID, a uniquely predetermined address designating a location in memory corresponding to said another program identified by the within-processor program ID;

transferring the data to said another processor identified in said identifying step; and storing the data at the address.

2. The method according to claim 1, wherein the program in each group are for performing one job.

3. The method according to claim 1, wherein the step of identifying includes the step of providing, in response to the program group ID/within-group program ID combination, a processor identification code (processor ID) which identifies said another processor.

4. The method according to claim 3, wherein the program in each program group are for performing one job.

5. In a multiple processor system comprising a plurality of processors for executing programs which belong to at least one of a plurality of program groups, wherein the programs which belong to any one of the program groups are allotted to different ones of the processors, wherein each program group is identified by a unique program group identification code (program group ID), and wherein each program within any one of the program groups is identified by a unique within-group program identification code (within-group program ID), a method comprising the steps of:

providing by each processor a combination of the program group ID assigned to the program group of the one program currently being executed by said each processor and the within-group program ID assigned to another one of the programs which belongs to the program group of the one program and which is to receive data outputted from said each processor during execution of the one program;

providing, in response to the program group ID/within-group program ID combination, a processor identification code (processor ID) which identifies another one of said processors to which said another program is allotted and a within-processor program identification code (within-processor program ID) which identifies said another program among the program allotted to said another processor; and transferring the data to said another program identified by the within-processor program ID and allotted to said another processor identified by the processor ID.

6. The method according to claim 5, wherein the program in each program group are for performing one job.

7. The method according to claim 5, wherein the step of providing the processor ID and the within-processor program ID includes the steps of:
   using the program group ID/within-group program ID combination to address a memory holding ID pairs each having a processor ID identifying one of said processors and a within-processor program ID identifying one of the programs among the programs allotted to said identified one processor, and
   outputting from the memory the processor ID which identifies said another processor and the within-processor program ID which identifies said another program among the program allotted to said another processor.

8. The method according to claim 7, wherein the programs in each program group are for performing one job.

9. The method according to claim 7, wherein the step of transferring includes the steps of:
   providing, in response to the within-processor program ID which identifies said another program, a uniquely predetermined address designating a location in memory corresponding to said another program, and
   storing the data at the address.

10. The method according to claim 9, wherein the programs in each program group are for performing one job.

11. A multiple processor system comprising:
   a plurality of processors for executing programs which belong to at least one of a plurality of program groups, wherein the programs which belong to any one of the program groups are allotted to different ones of the processors, wherein each program group is identified by a unique program group identification code (program group ID), and wherein each program within any one of the program groups is identified by a unique within-group program identification code (within-group program ID);
   each processor including means for providing a combination of the program group ID assigned to the program group of the one program currently being executed by said each processor and the within-group program ID assigned to another one of the programs which belongs to the program group of the one program and which is to receive data outputted from said each processor during execution of the one program;
   identifying means coupled to said processors and responsive to the program group ID/within-group program ID combination for identifying another one of said processors to which said another program is allotted and for providing a within-processor program identification code (within-processor program ID) which identifies said another program among the programs allotted to said another processor; and
   transfer means, coupled to said identifying means and to said processors and responsive to the within-processor program ID, for providing a uniquely predetermined address designating a location in memory corresponding to said another program identified by the within-processor program ID, for transferring the data to said another processor identified by said identifying means, and for storing the data at the address.

12. The multiple processor system according to claim 11, wherein the program in each program group are for performing one job.

13. The multiple processor system according to claim 11, wherein said identifying means includes a plurality of means each coupled to a responsive one of said processors and responsive to the program group ID/within-group program ID combination therefrom for providing to said transfer means a processor identification code (processor ID) which identifies said another processor.

14. The multiple processor system according to claim 13, wherein the program in each program group are for processing one job.

15. A multiple processor system comprising:
   a plurality of processors for executing programs which belong to at least one of a plurality of program groups, wherein the program which belong to any one of the program groups are allotted to different ones of the processors, wherein each program group is identified by a unique program group identification code (program group ID), and wherein each program within any one of the program groups is identified by a unique within-group program identification code (within-group program ID);
   each processor including means for providing a combination of the program group ID assigned to the program group of the one program currently being executed by said each processor and the within-group program ID assigned to another one of the programs which belongs to the program group of the one program and which is to receive data outputted from said each processor during execution of the one program;
   a plurality of identifying means each coupled to a respective one of said processors and responsive to the program group ID/within-group program ID combination therefrom for providing a processor identification code (processor ID) which identifies another one of said processors to which said another program is allotted and a within-processor program identification code (within-processor program ID) which identifies said another program among the programs allotted to said another processor; and
   transfer means, coupled to said processors and to said plurality of identifying means, for transferring data to said another program identified by the within-processor program ID and allotted to said another processor identified by the processor ID.

16. The multiple processor system according to claim 15, wherein the programs in each program group are for performing one job.

17. The multiple processor system according to claim 15, wherein said transfer means includes means responsive to the within-processor program ID for providing a uniquely predetermined address designating a location in memory corresponding to said another program identified by the within-processor program ID and for storing the data at the address.

18. The multiple processor system according to claim 17, wherein the programs in each program group are for performing one job.

19. The multiple processor system according to claim 15, wherein said transfer means includes a plurality of means each coupled to a respective one of said processors and responsive to the within-processor program ID for providing a uniquely predetermined address designating a location in memory corresponding to said another program identified by the within-processor program ID and for storing the data at the address.

20. The multiple processor system according to claim 19, wherein the program in each program group are for performing one job.

21. The multiple processor system according to claim 15, wherein each of said plurality of identifying means comprises memory holding ID pairs each having a processor ID identifying one of said processors and a within-processor program ID identifying one of the programs among the program allotted to said identified one processor, and wherein each of said plurality of identifying means addresses its memory using the program group ID/within-group program ID combination to provide the processor ID which identifies said another processor and the within-processor program ID which identifies said another program among the programs allotted to said another processor.

22. The multiple processor system according to claim 21, wherein the programs in each program group are for performing one job.

23. The multiple processor system according to claim 21, wherein said transfer means includes means responsive to the within-processor program ID which identifies said another program for providing a uniquely predetermined address designating a location in memory corresponding to said another program and for storing the data at the address.

24. The multiple processor system according to claim 23, wherein the programs in each program group are for performing one job.

25. The multiple processor system according to claim 21, wherein said transfer means includes a plurality of means each coupled to a respective one of said processor and responsive to the within-processor program ID which identifies said another program for providing a uniquely predetermined address designating a location in memory corresponding to said another program and for storing the data at the address.

26. The multiple processor system according to claim 25, wherein the programs in each groups group are for performing one job.

* * * * *